Patented Jan. 12, 1954

2,666,060

UNITED STATES PATENT OFFICE 2,666,060

1,3-BISAMINOALKYL-3-PHENYL-2,5-DIOXO-PYRROLIDINES

Ernst Sury, Basel, and Karl Hoffmann, Binningen, Switzerland, assignors to Ciba Pharmaceutical Products, Inc., Summit, N. J.

No Drawing. Application September 8, 1952,
Serial No. 308,521

Claims priority, application Switzerland
September 11, 1951

13 Claims. (Cl. 260—294.7)

The present invention relates to 1,3-bis-(tertiary amino-lower alkyl) - 3 - phenyl-2,5-dioxo-pyrrolidines and salts thereof. More particularly, the invention has especial relation to the quaternary ammonium salts of the aforesaid amines, since such salts exhibit curarizing properties and are accordingly useful as curariform agents.

The new compounds, in the base form, can be represented by the following general formula

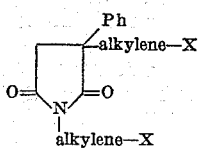

wherein Ph stands for a phenyl radical, alkylene stands for a lower alkylene radical containing more than one carbon atom, and X stands for a tertiary amino group, e. g., di-lower-alkylamino or an alkylene-imino, such as a piperidino group. The phenyl group can be unsubstituted or substituted, e. g. by alkyl groups, substituted or unsubstituted hydroxyl groups or halogen atoms.

Quaternary salts of particular interest are the bis-halogenomethylates of 3-phenyl - 1,3 - bis-(γ-piperidinopropyl) - 2,5 - dioxo - pyrrolidine, which can be represented by the following formula:

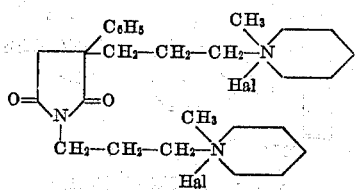

The aforementioned 1,3-bis-(tertiary amino-lower alkyl)-3-phenyl-2,5-dioxo-pyrrolidines are made by converting a 2 - phenyl - 2 - (tertiary aminoalkyl)-butane-1,4-diacid mononitrile ester into its cyclic secondary imide and introducing into the 1-position of the resulting 3-phenyl-3-(secondary aminoalkyl)-2,5-dioxo-pyrrolidine a tertiary aminoalkyl radical.

The tertiary amines that is, the 1,3-bis-(tertiary amino-lower alkyl)-3-phenyl - 2,5 - dioxo-pyrrolidines thus formed, are quaternized, for example, by reaction with reactive esters of alcohols, especially esters with hydrohalic acids, sulfuric acid or organic sulfonic acids, such as alkyl halides, dialkyl sulfates, and aliphatic or aromatic sulfonic acid esters.

In general, in practicing the process an appropriately substituted butane - 1,4 - diacid-mononitrile ester is used as starting material, and treated in the presence or absence of a solvent, such as glacial acetic acid or acetic anhydride, with a condensing agent such as concentrated sulfuric acid. Into the pyrrolidine unsubstituted at the ring nitrogen atom thus obtained, there is then introduced in the 1-position the tertiary amino alkyl radical, for example, by reaction with a tertiary aminoalkyl halide. This subsequent substitution is advantageously carried out in the presence of a condensing agent which is capable of forming metal compounds with the dioxo-pyrrolidines, such as an alkali metal amide, for example, sodamide.

The 1,3-bis-(tertiary aminoalkyl)-3-phenyl-2,5-dioxo-pyrrolidines are readily quaternized by heating together with reactive esters of alcohols, e. g. those hereinbefore mentioned.

The 2-phenyl-2-tertiary aminoalkyl-butane-1,4-diacid mononitrile ester employed as a starting material can, for example, be prepared by condensing a phenyl-(tertiary aminoalkyl)-acetic acid-nitrile with a bromo-acetic acid alkyl ester in the usual manner.

The following examples illustrate the invention, the parts being by weight unless otherwise stated and the relationship of parts by weight to parts by volume being the same as that of the gram to the cubic centimeter. Temperatures are in degrees centigrade.

*Example 1*

45 parts of 2 - phenyl - 2 - (β-diethylamino-ethyl) - butane-1,4-diacid-mononitrile-(1)-ethyl ester are dissolved in 50 parts by volume of glacial acetic acid, then admixed with 100 parts by volume of concentrated sulfuric acid, and the whole is heated for 15 minutes at 120-140° C. The dark colored reaction mixture is stirred into ice, adjusted to a pH value of 8-9 with aqueous ammonia, extracted with chloroform, and the chloroform solution is washed with water, dried over calcium chloride and the solvent is evaporated. The viscous residue is distilled in a high vacuum. The resulting 3-phenyl-3-(β-diethylamino - ethyl) - 2,5 - dioxo - pyrrolidine of the formula

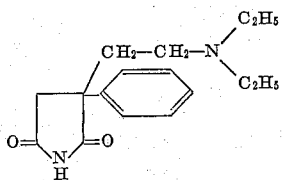

boils at 215–221° C. under 0.3 mm. pressure, crystallizes upon standing, melts at 89–90° C. and forms an easily water-soluble hydrochloride.

20 parts of 3-phenyl-3-(β-diethylamino-ethyl)-2,5-dioxo-pyrrolidine are caused to react in the presence of 4 parts of sodamide as condensing agent with 12 parts of β-chlorethyl-diethylamine in 300 parts by volume of toluene as solvent at 80–90° while stirring well. The reaction mixture is further stirred at room temperature overnight, then the solvent is distilled off under reduced pressure, the residue is taken up in ether, and the ethereal solution is washed with water and dried over calcium chloride. The solvent is distilled off and the oily residue is taken up in petroleum ether. Undissolved matter is removed by filtration, the solvent is evaporated and the residue is distilled in a high vacuum. 3-phenyl - 1,3 - bis -(β-diethylamino-ethyl) - 2,5-dioxo-pyrrolidine of the formula

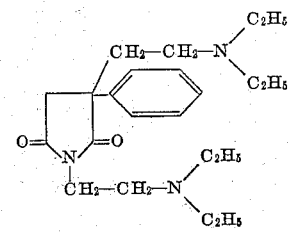

passes over at 216–220° under 0.08 mm. pressure in the form of a yellow oil.

The 3-phenyl-1,3-bis-(β-diethylamino-ethyl)-2,5-dioxo-pyrrolidine forms salts. Illustrative of the preparation of the latter is the following:

The 1,3-bis-(β-diethylamino-ethyl)-3-phenyl-2,5-dioxo-pyrrolidine forms, when treated with hydrochloric acid in ethyl acetate, a readily water-soluble dihydrochloride.

5 parts of 3-phenyl-1,3-bis-(β-diethylamino-ethyl)-2,5-dioxo-pyrrolidine, dissolved in 20 parts by volume of ethyl acetate form upon heating for a short time with 7 parts by volume of methyliodide at 50° the very hygroscopic, readily water-soluble 3-phenyl-1,3-bis-(β-diethylamino-ethyl)-2,5-dioxo - pyrrolidine-bis-iodomethylate of the formula

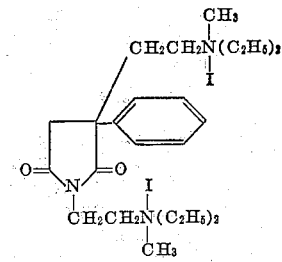

The 2-phenyl-2-(β-diethylamino-ethyl)-butane-1,4-diacid-mononitrile-(1)-ethyl ester used as starting material in this example can be made, for example, by condensing 216 parts of phenyl-(β-diethylamino-ethyl)-acetic acid nitrile with 177 parts of bromacetic acid ethyl ester in the presence of 45 parts of sodamide in 700 parts by volume of toluene. It boils at 155–161° under 0.08 mm. pressure.

*Example 2*

100 parts of 2-phenyl-2-(γ-diethylamino-propyl)-butane - 1,4 - diacid - mononitrile-(1)-ethyl ester are dissolved in 150 parts by volume of glacial acetic acid, then admixed with 150 parts by volume of concentrated sulfuric acid, the whole then heated for 15 minutes at 100–120°. The dark colored reaction mixture is stirred into ice, adjusted to a pH of 8–9 with aqueous ammonia, extracted with chloroform, and the chloroform solution is washed with water, dried over calcium chloride and the solvent is evaporated. The viscous residue is distilled under high vacuum. The resulting 3-phenyl-3-(γ-diethylamino - propyl) - 2,5-dioxo-pyrrolidine of the formula

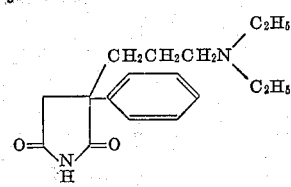

boils at 213–218° (0.05 mm.). It is a yellow viscous oil and forms a hydrochloride readily soluble in water.

20.0 parts of 3-phenyl - 3 -(γ- diethylamino-propyl) -2,5-dioxo-pyrrolidine are dissolved in 250 parts by volume of absolute toluene, and 3.2 parts of powdered sodamide introduced while stirring in an atmosphere of nitrogen at a temperature of 90–110°. With continued stirring, the reaction mixture is maintained at this temperature, and 12 parts of γ-chloropropyl-diethylamine, dissolved in 50 parts of toluene, are then added portionwise at 90°, and the reaction mixture is finally maintained at 90–110° for 3 hours longer. After cooling, there is obtained by working up as prescribed in Example 1, the 3-phenyl-1,3-bis-(γ-diethylamino-propyl)-2,5-dioxo - pyrrolidine as a yellow, highly viscous oil boiling at 192–198° under 0.06 mm. pressure.

5 parts of 3-phenyl-1,3-bis-(γ-diethylamino-propyl)-2,5-dioxo-pyrrolidine are dissolved in 25 parts by volume of absolute ethyl acetate, methyl bromide is introduced until saturation is achieved, the reaction mixture is heated for a short time in a closed vessel on the water bath, then cooled, and the 3-phenyl-1,3-bis - (γ- diethylamino-propyl)-2,5-dioxo-pyrrolidine-bis-bromomethylate of the formula

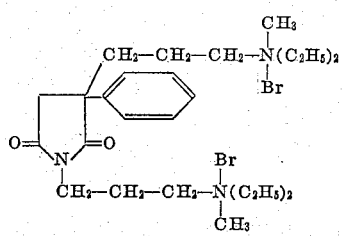

in the form of small colorless needles separated by filtration. After recrystallization from a mixture of methanol and ethyl acetate, the compound has a melting point of 169–170°.

The 2-phenyl-2-(γ-diethylamino-propyl)-butane - 1,4 - diacid - mononitrile - (1) - ethyl ester used as a starting material in this example can be made, for example, by condensing 150 parts of phenyl-(γ-diethylamino-propyl)-acetic acid-nitrile with 126 parts of bromacetic acid ethyl ester in the presence of 30 parts of sodamide in 400 parts by volume of toluene. It boils at 162–168° (0.08 mm.).

Example 3

140 parts of 2-phenyl-2-(γ-piperidino-propyl)-butane-1,4-diacid-mononitrile-(1)-ethylester are dissolved in 150 parts by volume of acetic acid, then admixed with 150 parts by volume of concentrated sulfuric acid, and the whole then heated for 15 minutes at 100–120°. The dark colored reaction mixture is stirred into ice, adjusted to a pH of 8–9 with aqueous ammonia, extracted with chloroform, and the chloroform solution is washed with water, dried over calcium chloride, and the solvent evaporated. The viscous residue is distilled under high vacuum. The resulting 3-phenyl - 3 - (γ - piperidino-propyl) - 2,5 - dioxo-pyrrolidine of the formula

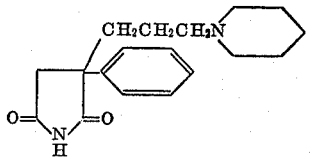

boils at 233–237° (0.07 mm.). After recrystallization from methanol the compound melts at 131–132°. It forms a water soluble hydrochloride.

30 parts of 3-phenyl-3-(γ-piperidino-propyl)-2,5-dioxo-pyrrolidine are dissolved in 300 parts by volume of absolute toluene, and 4.6 parts of powdered sodamide introduced in portions while stirring in an atmosphere of nitrogen at a reaction temperature of 100–110°. The reaction mixture is maintained at this temperature for six hours while stirring, then 20 parts of γ-chloropropyl-piperidine, dissolved in 50 parts by volume of toluene, are added in portionwise and the reaction mixture is finally maintained at a temperature of 100–110° for another 6 hours. By working up as in Example 1, there is obtained the 3-phenyl-1,3-bis-(γ-piperidino-propyl)-2,5-dioxo-pyrrolidine in the form of a yellowish oil which boils at 246–250° under 0.03 mm. pressure. The base can be characterized as a di-hydrochloride which, when recrystallized from a mixture of methanol and ethyl acetate, melts at 236–237°.

6. parts of 3-phenyl-1,3-bis-(γ-piperidino-propyl)-2,5-dioxo-pyrrolidine are dissolved in 50 parts by volume of absolute ethyl acetate, 6 parts by volume of methyl iodide are added and the reaction mixture heated at 90° on the water bath for 15 minutes. The 3-phenyl-1,3-bis-(γ-piperidino - propyl) - 2,5 - dioxo - pyrrolidine - bis - iodomethylate of the formula

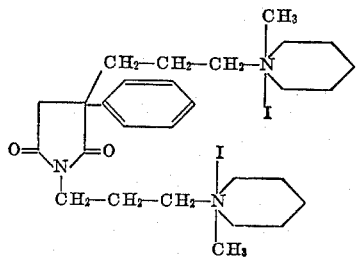

which precipitates in the form of white needles is separated by filtration and recrystallized from a mixture of methanol and ethyl acetate. Its melting point is at 185–186°.

The 2-phenyl-2-(γ-piperidino-propyl)-butane-1,4-diacid-mononitrile-(1)-ethyl ester used as a starting material in this example can be made, for example, by condensing 121 parts of phenyl-(γ-piperidino-propyl)-acetic acid-nitrile with 92 parts of bromoacetic acid ethyl ester in the presence of 23 parts of sodamide in 500 parts by volume of absolute ether. It boils at 180–190° (0.07 mm.).

Example 4

In the same manner as described in Example 3 8.4 parts of 3-phenyl-1,3-bis-(γ-piperidino-propyl)-2,5-dioxo-pyrrolidine, dissolved in 50 parts by volume of ethyl acetate, are reacted with 10 parts of methylbromide in a sealed tube for ½ hour at 45–50°. 3-phenyl-1,3-bis-(γ-piperidino - propyl) - 2,5 - dioxo - pyrrolidine-bis-bromomethylate is formed. It has the formula

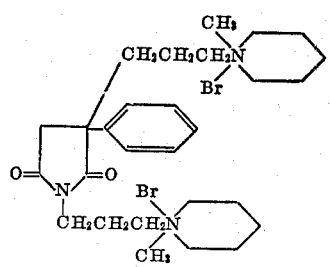

After recrystallization from isopropanol-ethyl acetate the colorless needles melt at 171–176°.

Example 5

A solution of 8.4 parts of 3-phenyl-1,3-bis-(γ-piperidino-propyl)-2,5-dioxo-pyrrolidine in 50 parts by volume of ethyl acetate are cooled with a carbonic acid-acetone mixture, and admixed with 10 parts of low cooled methylchloride. The mixture is left standing for 6 hours at room temperature in a sealed tube. The thus obtained 3-phenyl-1,3-bis-(γ-piperidino-propyl)-2,5 - dioxo - pyrrolidine - bis - chloromethylate has the formula

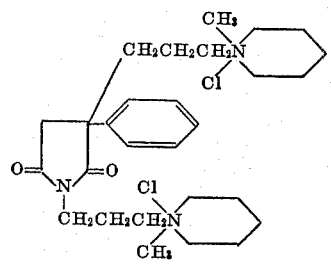

It melts after recrystallization from isopropanol-ethylacetate at 225–229°.

What is claimed is:

1. A compound selected from the group consisting of 3-phenyl-1,3-bis-[di-(lower-alkyl)-amino-lower alkyl] - 2,5 - dioxo-pyrrolidines, 3-phenyl-1,3 - bis - (piperidino - lower - alkyl) - 2,5-dioxo-pyrrolidines, the bis-acid-addition-salts and therapeutically applicable bis-lower-alkyl quaternary ammonium salts thereof.

2. 1,3 - bis - [di - (lower alkyl) - amino-lower alkyl]-3-phenyl-2,5-dioxo-pyrrolidines.

3. The therapeutically applicable bis-lower alkyl-quaternary ammonium salts of the compounds of claim 2.

4. The bis-lower-halogenalkylates of the compounds of claim 2.

5. The bis-halogenomethylates of the compounds of claim 2.

6. 3 - phenyl - 1,3-bis - ( - di-lower - alkyl-amino lower-alkyl)-2,5-dioxo-pyrrolidines.

7. The bis-lower-halogenalkylates of the compounds of claim 6.

8. 3 - phenyl - 1,3 - bis - (piperidino - lower alkyl) -2,5-dioxo-pyrrolidines.

9. The bis-lower-halogenalkylates of the compounds of claim 8.

10. 3 - phenyl - 1,3 - bis - ($\beta$ - diethylaminoethyl) - 2,5 - dioxo - pyrrolidine - bis - halogenomethylate.

11. 3 - phenyl - 1,3 - bis - ($\gamma$ - diethylaminopropyl) - 2,5 - dioxo - pyrrolidine - bis - halogenomethylate.

12. 3 - phenyl - 1,3 - bis - ($\gamma$ - piperidinopropyl) - 2,5 - dioxo - pyrrolidine - bis - halogenomethylate.

13. 3 - phenyl - 1,3 - bis - ($\gamma$ - piperidinopropyl) - 2,5 - dioxo - pyrrolidine - bis - iodomethylate.

ERNST SURY.
KARL HOFFMANN.

References Cited in the file of this patent

UNITED STATES PATENTS

| Number | Name | Date |
|---|---|---|
| 2,555,353 | Lucas et al. | June 5, 1951 |